United States Patent
Zero et al.

(10) Patent No.: US 11,122,365 B2
(45) Date of Patent: Sep. 14, 2021

(54) ACOUSTIC PROTECTIVE COVER ASSEMBLY CONTAINING A RETRACTED MEMBRANE MATERIAL

(71) Applicant: W. L. Gore & Associates, Inc., Newark, DE (US)

(72) Inventors: Scott Zero, Newark, DE (US); Zachary Lampert, Newark, DE (US); Theresa Tonge, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 16/340,622

(22) PCT Filed: Oct. 20, 2017

(86) PCT No.: PCT/US2017/057623
§ 371 (c)(1),
(2) Date: Apr. 9, 2019

(87) PCT Pub. No.: WO2018/075910
PCT Pub. Date: Apr. 26, 2018

(65) Prior Publication Data
US 2019/0268692 A1  Aug. 29, 2019

Related U.S. Application Data (60) Provisional application No. 62/411,470, filed on Oct. 21, 2016.

(51) Int. Cl.
*H04R 1/44* (2006.01)
*H04R 1/02* (2006.01)
(Continued)

(52) U.S. Cl.
CPC ............. *H04R 1/44* (2013.01); *G01F 1/36* (2013.01); *G01F 5/00* (2013.01); *G01F 25/0007* (2013.01);
(Continued)

(58) Field of Classification Search
CPC .......... H04R 1/086; H04R 1/44; H04R 1/023; H04R 1/025; H04R 1/283; H04R 2499/11;
(Continued)

(56) References Cited

U.S. PATENT DOCUMENTS 6,512,834 B1 * 1/2003 Banter .................. H04R 1/086
381/189
2013/0131780 A1  5/2013 Armstrong et al.
(Continued)

FOREIGN PATENT DOCUMENTS

EP  1 197 119 A2  4/2002
JP  2006-524283 A  10/2006
(Continued)

OTHER PUBLICATIONS

International Search Report and Written Opinion from International Application No. PCT/US2017/057623 dated Jan. 15, 2018.

*Primary Examiner* — Lun-See Lao
(74) *Attorney, Agent, or Firm* — Greenberg Traurig, LLP (57) ABSTRACT

An acoustic protective cover assembly can include a retracted membrane material traversing across an acoustic pathway defined by an opening in a housing. The retracted membrane material can include a fibril structure characterized by serpentine fibrils.

20 Claims, 9 Drawing Sheets

(51) Int. Cl.
  *G01F 1/36* (2006.01)
  *G01F 5/00* (2006.01)
  *G01F 25/00* (2006.01)
  *H04R 1/08* (2006.01)
  *B01D 39/16* (2006.01)
  *D04H 1/50* (2012.01)
  *B32B 5/02* (2006.01)
  *H04R 1/28* (2006.01)

(52) U.S. Cl.
  CPC ......... *H04R 1/023* (2013.01); *B01D 39/1692* (2013.01); *B32B 5/02* (2013.01); *D04H 1/50* (2013.01); *H04R 1/086* (2013.01); *H04R 1/283* (2013.01)

(58) Field of Classification Search
  CPC . H04L 43/08; H04L 43/0852; H04L 43/0864; H04L 47/193; H04L 47/283; H04M 1/02; H04M 1/03; H04M 1/18; H04W 24/08
  USPC ....... 381/386, 398, 361, 355, 367, 396, 150, 381/173, 372; 181/286, 132, 175
  See application file for complete search history.

(56) References Cited

U.S. PATENT DOCUMENTS

| | | | |
|---|---|---|---|
| 2013/0183515 A1* | 7/2013 | White | B29C 55/005 428/297.4 |
| 2013/0184807 A1* | 7/2013 | Kovach | A61L 31/048 623/1.13 |
| 2014/0048351 A1* | 2/2014 | Banter | G10K 11/002 181/286 |
| 2014/0135897 A1 | 5/2014 | Cully et al. | |
| 2014/0180402 A1* | 6/2014 | Bruchman | A61L 27/56 623/2.18 |

FOREIGN PATENT DOCUMENTS

| | | |
|---|---|---|
| JP | 2009-303279 A | 12/2009 |
| WO | WO-2001/003468 A2 | 1/2001 |
| WO | 2013/109337 A1 | 7/2013 |
| WO | WO-2016/040632 A2 | 3/2016 |

\* cited by examiner

ACOUSTIC PROTECTIVE COVER ASSEMBLY CONTAINING A RETRACTED MEMBRANE MATERIAL

CROSS-REFERENCE TO RELATED APPLICATIONS

The present application is a U.S. National stage entry of PCT/US2017/057623 filed on Oct. 20, 2017, which claims the benefit of U.S. Provisional Application No. 62/411,470 filed Oct. 21, 2016, the full disclosures of which are incorporated herein by reference in their entireties for all purposes.

TECHNICAL FIELD

The present disclosure relates generally to acoustic membranes. More specifically, but not by way of limitation, this disclosure relates to a protective cover assembly containing a retracted membrane material.

BACKGROUND

Acoustic cover technology is utilized in many applications and environments, for protecting sensitive components of acoustic devices from environmental conditions. Various components of an acoustic device operate best when not in contact with debris, water, or other contaminants from the external environment. In particular, acoustic transducers (e.g. microphones, speakers) may be sensitive to fouling. For these reasons, it is often necessary to enclose working parts of an acoustic device with an acoustic cover.

Known protective acoustic covers include non-porous films and porous membranes, such as expanded polytetrafluoroethylene (ePTFE). Protective acoustic covers are also described in U.S. Pat. Nos. 6,512,834 and 5,828,012. A protective cover can transmit sound in two ways: the first is by allowing sound waves to pass through it, known as a resistive protective cover; the second is by vibrating to create sound waves, known as a vibroacoustic, or reactive, protective cover.

Japanese Pub. No. 2015-142282 discloses a waterproof component provided with a waterproof sound-transmittable film. A support layer is adhered to the surface of at least one side of the waterproof sound-transmittable film. The support layer polyolefin-system-resin foam, with a loss modulus of less than $1.0 \times 10^7$ Pa.

U.S. Pat. No. 6,188,773 discloses a waterproof type microphone, which includes a mike casing provided with an unit accommodating chamber having a sound receiving opening portion, a mike unit accommodated in the unit accommodating chamber, and a waterproof membrane air tightly mounted on the sound receiving opening portion.

U.S. Pub. No. 2014/0270273 discloses system and method for controlling and adjusting a low-frequency response of a MEMS microphone. The MEMS microphone includes a membrane and a plurality of air vents. The membrane is configured such that acoustic pressures acting on the membrane cause movement of the membrane.

U.S. Pub. No. 2015/0163572 discloses a speaker or microphone module that includes an acoustic membrane and at least one pressure vent.

A continuing problem that exists is that many acoustic cover membranes prove unsuitable for some environments. For example, increasing the resiliency of a membrane in an acoustic protective assembly against water penetration can decrease the ability of the assembly to properly transmit sound.

Brief Summary of Some Example Embodiments

According to one embodiment of the present invention, a protective cover assembly for an acoustic device is disclosed. The protective cover assembly includes a housing having an opening for passing acoustic waves between an exterior of the housing and an acoustic cavity therein; and a sound-transmissive membrane connected with the housing and separating the acoustic cavity and the exterior of the housing. The sound-transmissive membrane has an acoustic insertion loss of less than 6 dB at 1 kHz, and is resistant to water penetration, e.g. having a water entry pressure (WEP) of at least 9.8 kPa. In certain embodiments, the sound-transmissive membrane can have an ATEQ airflow rate of at least 10 L/hr per 2.0 cm$^2$ of working area of the membrane.

In various embodiments, the sound-transmissive membrane of the protective cover assembly includes an expanded fluoropolymer membrane. In some specific embodiments, the sound-transmissive membrane is an ePTFE membrane or ePTFE composite. In cases where the sound-transmissive membrane is formed by retraction (i.e. thermal retraction) the sound-transmissive membrane, made from a retracted membrane material, may have an area ratio of less than 75% of an associated precursor membrane.

In at least one embodiment, a protective, sound-transmissive cover for an acoustic device is disclosed. The sound-transmissive cover can have a microstructure comprising serpentine fibrils. In some cases, the sound-transmissive membrane may have an inner diameter of 1.6 mm or more. In some embodiments, the sound-transmissive membrane can be smaller than 1.6 mm, e.g., less than 1.5 mm, e.g. less than 1.25 mm, e.g. less than 1 mm, or smaller. In some embodiments, the sound-transmissive membrane can have an acoustic insertion loss of, e.g., less than 6 dB at 1 kHz, less than 5 dB at 1 kHz, less than 4 dB at 1 kHz, less than 3 dB at 1 kHz, or less than 1 dB at 1 kHz. In various embodiments, the sound-transmissive membrane can have an ATEQ airflow rate of at least 10 L/hr per 2.0 cm$^2$. In some embodiments, the sound transmissive cover is an expanded fluoropolymer membrane. The expanded fluoropolymer membrane can have an acoustic insertion loss of less than 4 dB at 1 kHz., less than 3 dB at 1 kHz, or less than 1 dB at 1 kHz.

The sound-transmissive cover can include an expanded fluoropolymer membrane. The membrane can have an area density greater than or equal to 6 g/m$^2$ and a thickness less than 15 µm, according to some embodiments. The sound transmissive cover may have an area density greater than or equal to 7 g/m$^2$ and a thickness less than 15 µm. The expanded fluoropolymer membrane may have an ATEQ airflow rate of at least 15 L/hr per 2.0 cm$^2$. In certain embodiments, the membrane may be water impermeable to at least a pressure of 9.8 kPa.

In at least one embodiment, a sound-transmissive membrane for an acoustic device is disclosed has comprising a retracted membrane material. The retracted membrane material can have an acoustic insertion loss of less than 5 dB at 1 kHz, and can have a WEP of at least 9.8 kPa. In some embodiments, the retracted membrane material can have an ATEQ airflow rate of at least 10 L/hr per 2.0 cm$^2$. In certain embodiments, the retracted membrane material can have an area ratio of less than 0.75:1 (i.e. less than 75%) relative to an initial area of a precursor membrane. In some embodiments, the retracted membrane material can be thermally retracted. In some other embodiments, the retracted membrane material can be solvent retracted.

In some embodiments, the retracted membrane material has a mass per area of at least 6.9 g/m² and a thickness of less than 16 μm. The retracted membrane material may be air permeable and water impermeable. For example, the retracted membrane material may be water impermeable to at least a pressure of 9.8 kPa.

These and other embodiments, along with many of their advantages and features, are described in more detail in conjunction with the below description and attached figures.

BRIEF DESCRIPTION OF THE DRAWINGS

The present invention will be better understood in view of the appended non-limiting figures.

DETAILED DESCRIPTION

Various embodiments described herein address an acoustic protective cover assembly for an acoustic device. Specifically, some embodiments herein address a retracted acoustic membrane, which includes a membrane material containing serpentine fibrils.

The acoustic protective cover assembly includes a retracted acoustic membrane that provides protection from moisture and water infiltration. In one embodiment, an acoustic cover comprises a retracted membrane material for high immersion applications. Advantageously the membrane provides resistance to moisture and protects the acoustic device from potential damage from the exterior environment. The assemblies having sound-transmissive membranes as described herein have improved performance at transmitting sound compared to conventional assemblies that do not employ retracted membrane materials, while retaining comparable or improved protective properties.

Protective Cover Assembly

Figure 1:
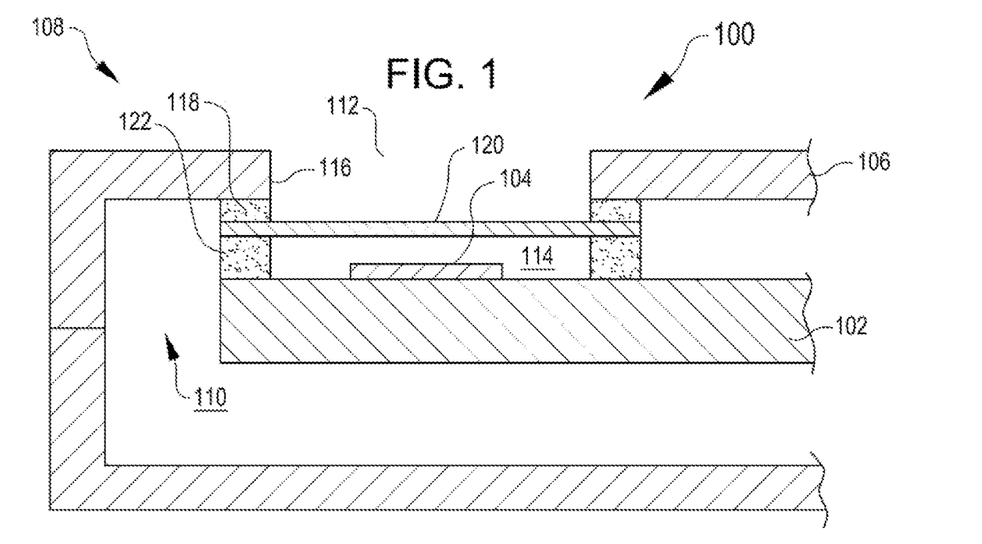
FIG. 1 shows a cross-sectional view of an acoustic device with acoustic protective cover assembly containing a retracted membrane material, in accordance with embodiments.

FIG. 1 shows a cross-sectional view of a protective cover assembly 100 for an acoustic device 102, in accordance with embodiments. The acoustic device 102 may be an electronic device for generating and/or receiving the acoustic waves, e.g. at a transducer 104. An acoustic cavity 114 adjacent to the transducer 104 passes acoustic waves to or from the transducer. In some embodiments, the transducer 104 can be a microphone or other acoustic sensor, a speaker, a pressure sensor, or other comparable type of sensor. In some embodiments, the transducer 104 may be a micro-electric mechanical (MEMs) device, such as a microphone, acoustic sensor or acoustic speaker. The acoustic device 102 may be an electronic circuit board, for example a flex circuit, containing the transducer 104 thereon. In some embodiments, the acoustic device 102 may be a sensing module or control circuit for a portable electronic device, such as a cellular phone, smartphone, tablet, portable microphone, handheld computing device or other comparable device.

The acoustic device 102 is at least partially encompassed by a housing 106, which protects the acoustic device 102 from an external environment 108, and may be at least partially sealed and/or waterproof. The housing 106 may be a plastic or metal case. The housing 106 contains an interior environment 110 which at least partially surrounds the acoustic device 102.

An acoustic pathway 112 is partly defined by an opening 116 in the housing 106. Although a single opening is shown in FIG. 1, in other embodiments there may be a plurality of openings in the housing that collectively define an acoustic pathway or individual acoustic pathways. The opening 116 in housing 106 is for passing acoustic waves between an exterior 108 of the housing 106 and an acoustic cavity 114 therein. In one embodiment, the acoustic pathway 112 is arranged to allow pressure waves, i.e. acoustic waves, to propagate from an exterior the housing 106 to the transducer 104 of the acoustic device 102 when detecting sound. Similarly, in other embodiments, acoustic pathway 112 is arranged to allow pressure waves produced by the acoustic device 102 to propagate towards the exterior of the housing 106. The acoustic pathway 112 is traversed by a retracted membrane material 120, which further defines an acoustic cavity 114. Because the retracted membrane material 120 traversed the acoustic pathway 112 the retracted membrane 120 may also be referred to herein as the sound-transmissive membrane or acoustic membrane. The acoustic cavity 114 is disposed between the retracted membrane material 120 and a portion of the acoustic device 102 including the transducer 104. To provide a sufficient acoustic cover, minimum diameter of the retracted membrane material 120 is at least equal to or greater than the maximum diameter of the opening 116. The maximum diameter of the opening 116 may vary depending on the application and construction of the housing 106. The acoustic protective assembly is suitable for any size of opening and is not particularly limited. In one exemplary embodiment, the diameter of the opening 116 is from 0.1 mm to 500 mm, e.g., 0.3 mm to 25 mm, e.g., 0.5 mm to 10 mm. Based on these exemplary diameters of the opening, the minimum diameter of the retracted membrane material, is at least 0.1 mm, e.g., at least 0.3 mm, e.g., at least 0.5 mm, e.g., at least 1.0 mm, e.g., at least 1.5 mm, or, e.g., at least 1.6 mm. Having such a size relationship allows the retracted membrane material 120 to fully traverse the acoustic pathway 112 and prevent intrusion of fluid or moisture into the acoustic cavity 114. The interior environment 110 of the housing 106 is also at least partially sealed from intrusion of fluid or moisture from an exterior environment by the retracted membrane material 120.

The retracted membrane material 120 can be secured between the acoustic device 102 and the housing 106 by, e.g., a first layer 118 (or layers) and a second layer 122 (or second layers). The first and second layers 118, 122 may include any suitable means for securing a membrane, such as adhesive layers (i.e. double-sided adhesive layers), breathable layers for promoting air exchange between the acoustic cavity 114 and the interior 110 of the housing 106 (e.g., the second layer or layers 122 may include a breathable layer). In some embodiments, the retracted membrane material 120 may be held between the housing 106 and acoustic device 102 by mechanical clamping force with or without the assistance of adhesives. In certain embodiments, the first layer 118 may be an extension of the housing 106.

In some embodiments, a total thickness of the retracted membrane material 120 and the first and second layers 118, 122 may be on the order of about 25 μm to about 2500 μm. In one embodiment, a total thickness of the layered assembly may be on the order of about 100 μm to less than 1000 μm. Without being limiting, in some exemplary applications, an acoustic device may be used in combination with a MEMs transducer having comparably small thickness, e.g. on the order of 100 μm to 1000 μm. Thus, an acoustic device incorporating the retracted membrane material 120 may be very thin, on the order of 0.2 to 1.2 mm, which is suitable for inclusion in many small form factor applications, such as handheld electronic devices.

In some embodiments the retracted membrane material may be a layer of polymer composite, which may alternatively be nonporous, microporous, or porous. Various nonporous materials which may be used in a retracted membrane material may include polymer films (e.g. TPU, PET, Silicone, Polystyrene block copolymer, FEP, and the like) or polymer composites. Porous materials, which may include expanded polytetrafluoroethylene (ePTFE) materials and ePTFE composite materials, provide a good balance of acoustics and water protection. Various porous and nonporous materials have excellent acoustic transference and provide excellent water protection, in addition to being very thin and lightweight. In some cases, a membrane material can be treated. For example, a membrane material can include an oleophobic coating, e.g. by an oleophobic polymer, before or after the membrane material is retracted.

In various embodiments, the retracted membrane material has a microstructure including serpentine fibrils. As used herein, the term "serpentine fibrils" means multiple fibrils that curve or turn one way then another. The serpentine fibrils may generally have a width of about 1.0 micron or less. The serpentine fibrils may be connected by nodes. Serpentine fibrils may be formed by, e.g., controlled retraction as described in U.S. Patent Pub. No. 2013/0183515. Controlled retraction can be achieved by causing articles to shorten in length in at least one direction by the application of heat, by wetting with a solvent, or by any other suitable means or combinations thereof in such a way as to inhibit folding, pleating, or wrinkling of the subsequent article visible to the naked eye. A retracted membrane can be created by retracting a precursor membrane to convert a substantial portion of fibrils therein into serpentine fibrils. In some cases, articles that have been retracted in accordance with the teachings of the present disclosure may require elongation in the direction of retraction in order to identify the serpentine fibrils.

In one embodiment the retracted membrane may have thickness no greater than 100 μm, no greater than 50 μm, or no greater than 20 μm. In some embodiments, the retracted membrane may have a thickness no greater than 16 μm, no greater than 14 μm, no greater than 12 μm, or no greater than 10 μm. The retracted membrane is sufficiently thick to resist bursting under pressures caused by fluctuating exterior pressure and/or fluctuating temperature within the acoustic cavity, while being sufficiently thin so as to minimally obstruct acoustic energy passing through the retracted membrane. A retracted membrane is sufficiently thick to resist excessive deformation of the membrane that would detrimentally impact acoustic performance. The area density (i.e. mass per unit area) of a retracted membrane can vary from, e.g., less than 15 $g/m^2$, less than or equal to 12 $g/m^2$, or less than or equal to 10 $g/m^2$, according to some embodiments.

Adhesive layers, such as the first and second layers 118, 122, can be formed of any suitable layer having an adhesive surface on each side for connecting two parts. For example, an adhesive layer can be a polymer layer impregnated with an adhesive surface treatment, similar to a two-sided plastic tape. Adhesive layers may include a double-sided self-adhesive tape comprising a PET backing and a tackified acrylic adhesive (e.g. TESA® 4972). Adhesive layers can have varying thicknesses according to a desired thickness of a pressure equalizing assembly. Exemplary adhesive layers may be any suitable thickness on the order of 5 to 1000 μm. In certain embodiments, multiple adhesive layers may be stacked together to provide additional height, e.g., to increase the volume of the acoustic cavity 114, to increase an offset between the housing 106 and the retracted membrane material 120, or both. Specific examples of adhesive layers are about 30 μm thick, or about 48 μm thick. Generally, an adhesive layer is waterproof and nonporous. In one embodiment, an adhesive layer adjacent to an external environment is waterproof, while other adhesive layers may be waterproof.

The present invention will be better understood in view of the following non-limiting examples and test results.

Example Membranes

Figure 2:
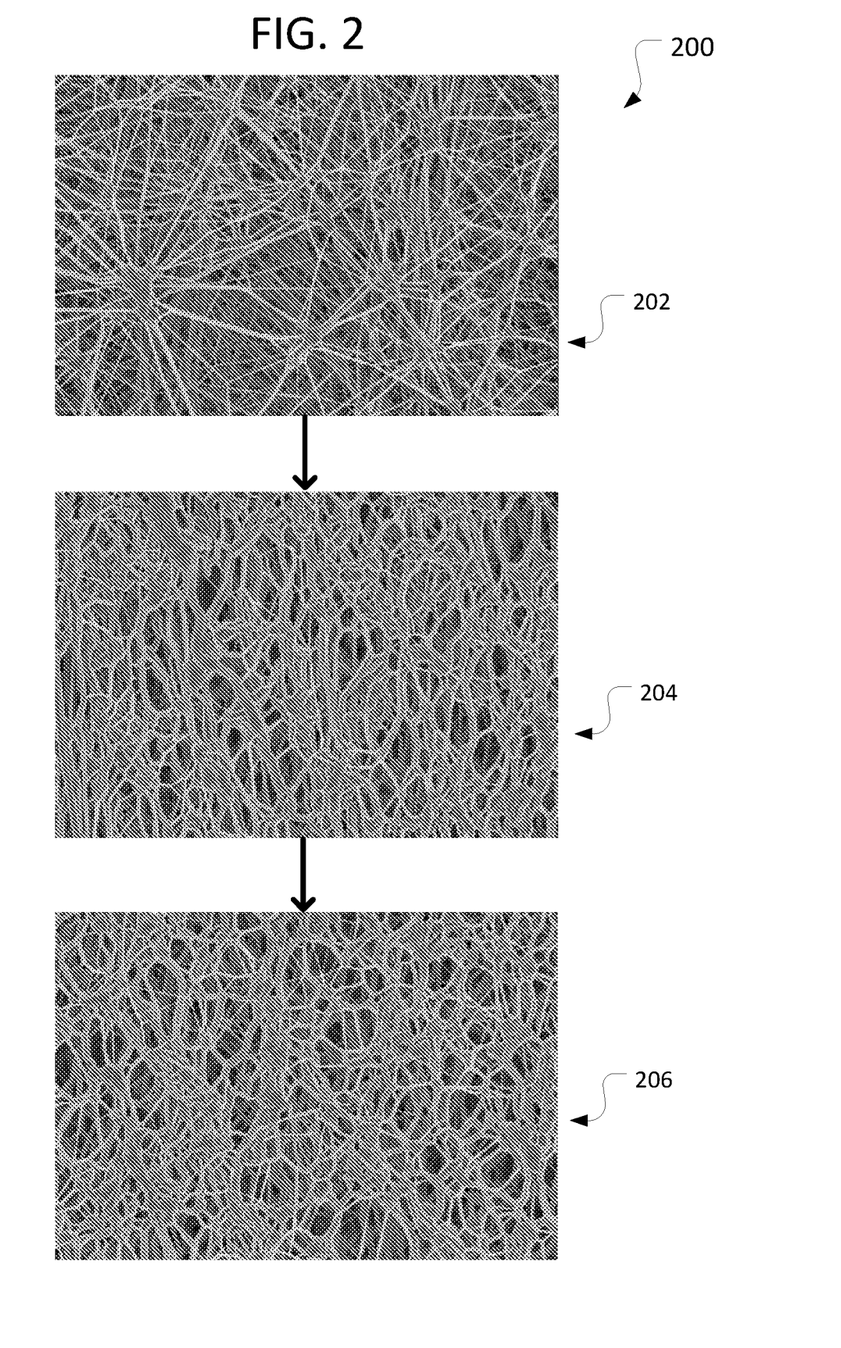
FIG. 2 shows a series of SEM micrographs showing a precursor of a retracted membrane material, the precursor in a retracted state, and the retracted membrane material in a partially relaxed state, in accordance with some embodiments.

FIG. 2 shows a series 200 of SEM micrographs showing a precursor 202 of a retracted membrane material, the precursor in a retracted state (204), and the retracted membrane material in a partially relaxed state (206), in accordance with some embodiments of the present disclosure. The precursor 202 is a microporous expanded functional tetrafluoroethylene polymer (TFE) copolymer, or an ePTFE copolymer, having a microstructure characterized by nodes interconnected by fibrils, similar to functional TFE copolymers as described in, e.g., U.S. Pat. No. 3,953,566.

It will be understood that comparable fibrillated polymer materials may also be suitable precursors for a retracted membrane material, including membrane materials containing greater or lesser ratios of nodes to fibrils, or substantially different microstructures, as described in, e.g., U.S. Pat. Nos. 5,814,405 and 4,902,423. The specific precursor membrane 202 is discussed further below with reference to Comparative Example 2, shown also in FIG. 4. This membrane is available from W.L. Gore and Associates as part number GAW 333.

The precursor 202 can be retracted by utilizing increased temperature while controlling the degree of retraction, forming a thermally retracted membrane. For example, the retracted state 204 can be achieved by allowing the precursor 202 to retract under heating at 300° C. to an area ratio of approximately 0.58:1 with reference to the original area of the precursor 202. The retraction causes the fibrils to deform and assume a serpentine structure and appearance.

A precursor 202 may be retracted to form a membrane having serpentine fibrils by methods other than thermal retraction. For example, in some embodiments, precursors may be retracted by application of a solvent (e.g., Isopropyl alcohol) and allowing the solvent to dry from the membrane while it is unrestrained, forming a solvent-retracted membrane.

The fully retracted precursor 204 may also be partially relaxed, or unretracted, by applied tension. The partially relaxed, retracted membrane material 206 shown in FIG. 2 has been partially retracted to an area ratio of approximately 0.575:1 with reference to the original precursor 202.

Further examples of precursor membranes and retracted membranes are discussed below with reference to FIGS. 3-7, and Table 1, below.

TABLE 1

| Example Number | Final/Initial Area Ratio | Mass Per Area (g/m$^2$) | Thickness (μm) | ATEQ Airflow (L/h) | Insertion Loss at 1 kHz (dB) |
|---|---|---|---|---|---|
| Comparative Example 1 | 1.00 | 5.1 | 16.4 | 10.12 | 6.1 |
| Example 1 | 0.74 | 6.9 | 12.9 | 16.8 | 3.4 |
| Example 2 | 0.73 | 7 | 14.2 | 17.3 | 3.9 |
| Example 3 | 0.38 | 13.3 | 10 | 11.9 | 3.8 |
| Example 4 | 0.56 | 9.1 | 11.4 | 20 | 2.4 |
| Example 5 | 0.45 | 11.3 | 14 | 15.2 | 3.6 |
| Example 6 | 0.61 | 8.4 | 14 | 16.5 | 4.1 |
| Comparative Example 2 | 1.00 | | | | 1.2 |
| Example 7 | 0.58 | 6.9 | 12 | 18.5 | 0.7 |

The Final/Initial Area ratio is a measure of the retraction of a membrane compared to its respective precursor membrane. The ATEQ airflow rate is a measure of the air permeability of a membrane as measured by the ATEQ airflow test described below in terms of liters of airflow through a given membrane per unit time. In each case, the samples were membranes formed into circular acoustic covers having inner diameters of 1.6 mm. The insertion loss is a measure of the degree by which a given membrane obstructs the passage of sound through the membrane, as measured in an Insertion Loss Detection Test, as described below. The insertion loss is measured as the difference in sound pressure detected by a test assembly due to the presence of obstruction by the membrane. Comparative Examples 1 and 2 are unretracted membrane materials, which are also used herein as precursors for the various example membranes. The example membranes, Examples 1-7, are retracted membrane materials produced by retracting a precursor membrane.

The creation of the serpentine fibrils can be achieved through a thermally-induced controlled retraction of the expanded polytetrafluoroethylene (ePTFE), through wetting the article with a solvent, such as, but not limited to, isopropyl alcohol or Fluorinert® (a perfluorinated solvent commercially available from 3M, Inc., St. Paul, Minn.), or by a combination of these two techniques.

Comparative Example 1

Figure 3:
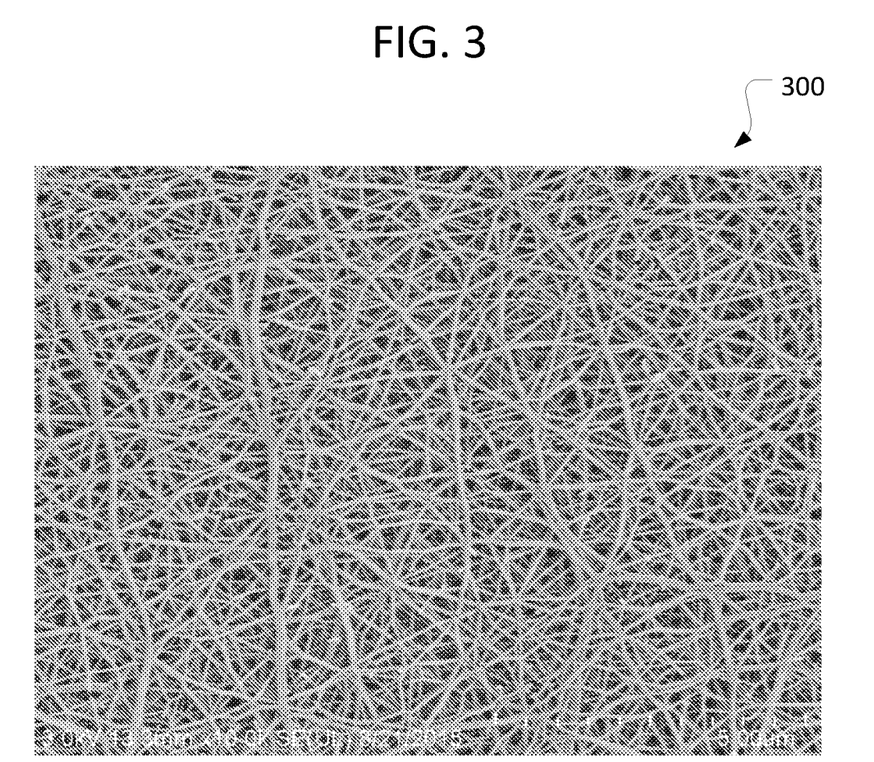
FIG. 3 shows an SEM micrograph of a first comparative example of a membrane.

FIG. 3 shows an SEM micrograph of the first comparative example 300 of a membrane. The first comparative example membrane 300 was made according to U.S. Pat. No. 7,306,729 having a mass per unit area of 5.2 g/m$^2$, a bubble point of 924 kPa, an ATEQ airflow rate of 10.1 L/hour through 2.0 cm$^2$ at a differential pressure of 12 mbar, a thickness of 16.4 microns, and longitudinal and transverse matrix tensile strengths of 314 MPa and 419 MPa, respectively.

Comparative Example 2

Figure 4:
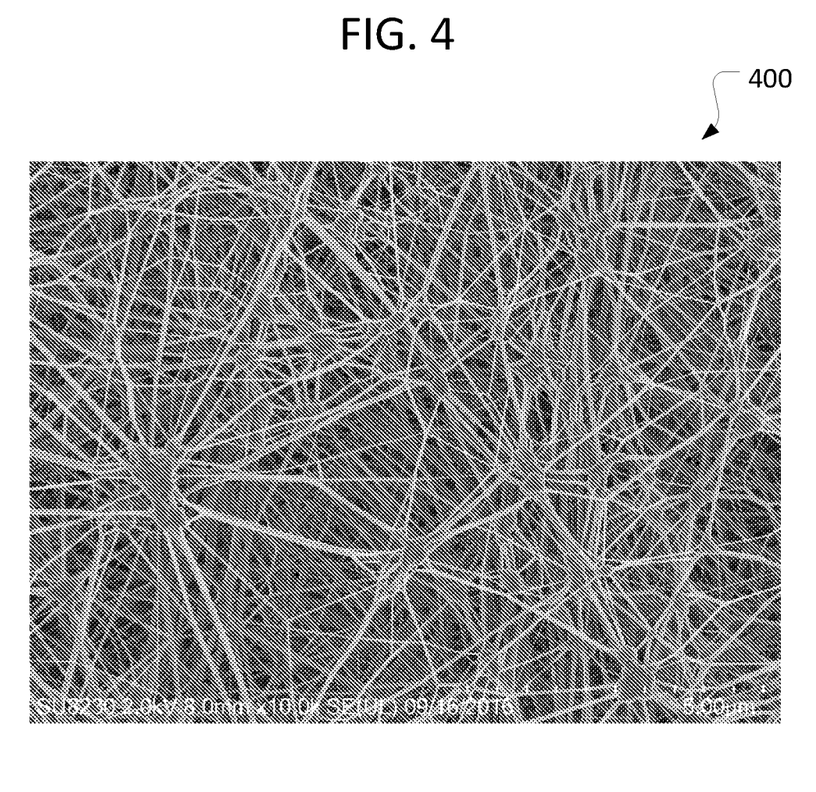
FIG. 4 shows an SEM micrograph of a second comparative example of a membrane.

FIG. 4 shows an SEM micrograph of a second comparative example 400 of a membrane. The second comparative example membrane was made according to U.S. Pat. No. 3,953,566, as discussed above with respect to the precursor membrane 202 described with reference to FIG. 2.

Example 1

Figure 5:
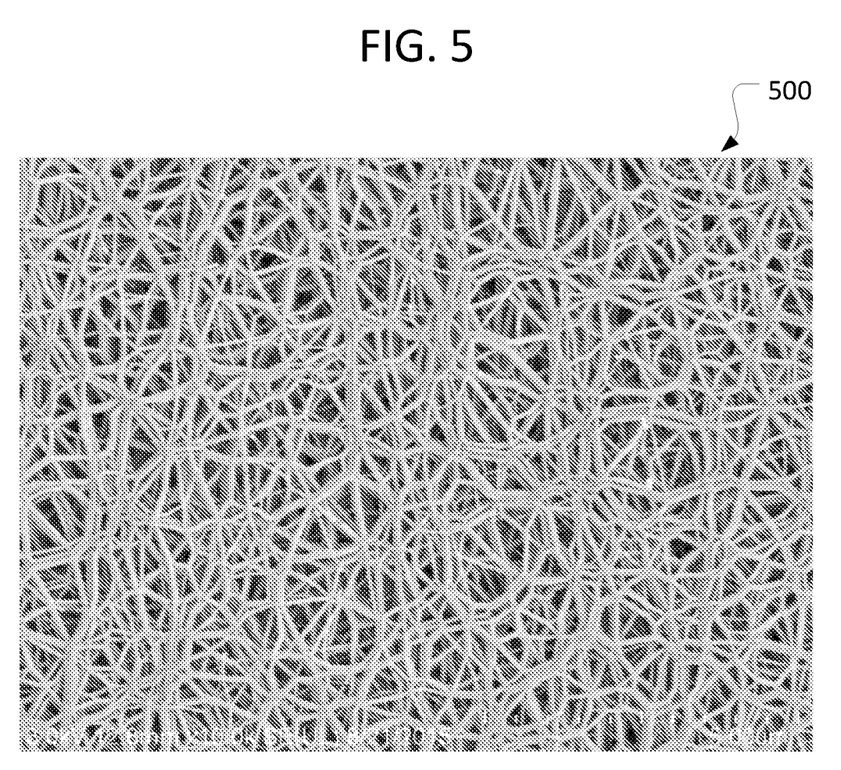
FIG. 5 shows an SEM micrograph of a first example of a retracted membrane material, in accordance with some embodiments.

FIG. 5 shows an SEM micrograph of a first example 500 of a retracted membrane material, in accordance with some embodiments. The first example 500 retracted membrane material was produced using the first comparative example 300 as a precursor. The precursor was biaxially restrained in a frame and placed in an oven at 320° C. for 30 seconds, allowed to retract in the transverse direction to an area ratio of about 0.74:1 relative to its initial area, and then allowed to cool to room temperature. The resulting retracted membrane material 400 exhibited a mass per unit area of 6.9 g/m$^2$, an ATEQ airflow rate of 16.8 L/hour, and a thickness of 12.9 microns.

Notably, the first example 500 retracted membrane material exhibits an improved ATEQ airflow rates compared to its precursor, the first comparative example 300. At the same time, the first example 500 exhibited significantly reduced insertion loss of 3.4 dB, compared to an insertion loss of 6.1 dB of the precursor. These results indicate that concurrent improvements in both sound transmission (inverse of insertion loss) and airflow rate (ATEQ Airflow) were achieved. This result is particularly surprising given that one would ordinarily expect an increased density of the membrane to accompany at least one of a loss in airflow performance or loss in sound transmission.

Example 2

Figure 6:
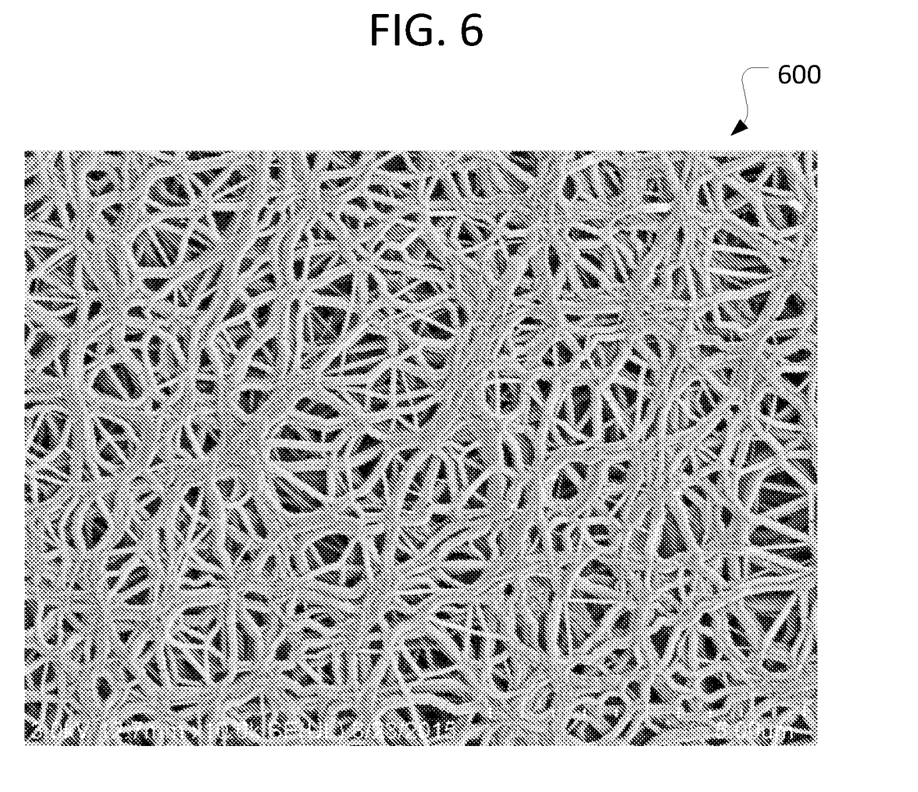
FIG. 6 shows an SEM micrograph of a second example of a retracted membrane material, in accordance with some embodiments.

FIG. 6 shows an SEM micrograph of a second example 600 of a retracted membrane material, in accordance with some embodiments. The second example 600 retracted membrane material was produced using the first example membrane 500 as a precursor. The precursor was retracted to an area ratio of about 0.73:1 relative to its initial area. The resulting second example membrane 600 exhibited a mass per unit area of 7.0 g/m$^2$, an ATEQ airflow rate of 17.3 L/hour, and a thickness of 14.2 microns.

The second example membrane 600 achieved similar performance to the first example membrane 500. For example, the second example membrane 600 achieved even higher ATEQ airflow rate than the first example membrane 500 (17.3 L/hr compared to 16.8 L/hr), with only slight increase in the insertion loss (3.9 dB compared to 3.4 dB). Both performance metrics were substantially improved over the initial precursor, the first comparative example membrane 300.

Example 3

A third example retracted membrane material was derived from a precursor based on the first comparative example 300. The third example membrane was retracted by an area ratio of 0.38:1 in the transverse direction at a temperature of 360° C. This yielded a membrane having a mass per unit area of 13.3 g/m$^2$, an ATEQ airflow rate of 11.9 L/hour, and a thickness of 10 microns. The third example retracted membrane material achieved an insertion loss of 3.8 dB and an ATEQ airflow rate of 11.9 L/h.

Example 4

A fourth example retracted membrane material was derived from a precursor based on the first comparative example 300. The fourth example membrane was retracted by an area ratio of 0.56:1 in the transverse direction at a temperature of 360° C. This yielded a membrane having a mass per unit area of 9.1 g/m$^2$, an ATEQ value of 20 L/hour, and a thickness of 11.4 microns. The fourth example retracted membrane material achieved an insertion loss of only 2.4 dB and an ATEQ airflow rate of 20.0 L/h.

Example 5

A fifth example retracted membrane material was derived from a precursor based on the first comparative example 300. The fifth example membrane was retracted by an area ratio of 0.45:1 in the transverse direction at a temperature of 320° C. This yielded a membrane having a mass per unit area of 11.3 g/m$^2$, an ATEQ value of 15.2 L/hour, and a thickness of 14 microns. The fifth example retracted membrane material achieved an insertion loss of 3.6 dB and an ATEQ airflow rate of 15.2 L/h.

Example 6

A sixth example retracted membrane material was derived from a precursor based on the first comparative example 300. The sixth example membrane was retracted by an area ratio of 0.61:1 in the transverse direction at a temperature of 320° C. This yielded a membrane having a mass per unit area of 8.4 g/m$^2$, an ATEQ airflow rate of 16.5 L/hour, and a thickness of 14 microns. The fifth example retracted membrane material achieved an insertion loss of 4.1 dB and an ATEQ airflow rate of 16.5 L/h.

Example 7

Figure 7:
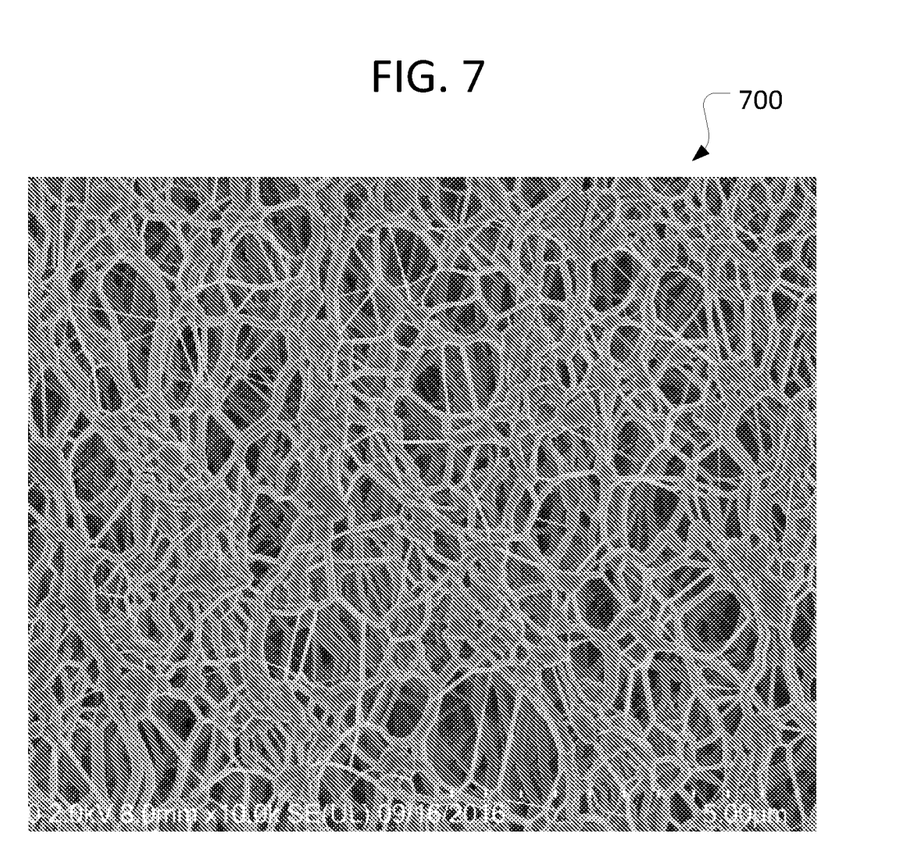
FIG. 7 shows an SEM micrograph of a third example of a retracted membrane material, in accordance with embodiments.

FIG. 7 shows an SEM micrograph of a seventh example 700 of a retracted membrane material, in accordance with embodiments. The seventh example membrane 700 differs from examples 1-6 in that it was derived from a precursor based on the second comparative example membrane 400, illustrated in FIG. 4. The seventh example membrane 700 is also illustrated with its precursor in FIG. 2 (e.g., precursor 202, retracted precursor 204, and retracted membrane material 206). As described above with reference to FIG. 2, the seventh example membrane 700 is retracted to an area ratio of 0.57:1 with reference to its precursor membrane while heated to 320° C. The seventh example membrane 700 was retracted in the transverse direction, and yielded a membrane material having a mass per unit area of 6.9 g/m$^2$, an ATEQ airflow rate of 18.5 L/hr, and a thickness of 12 microns. As with previous examples of retracted membrane materials, the seventh example membrane 700 achieved improvements in insertion loss over its precursor membrane (of 0.7 dB compared to 1.2 dB) while achieving airflow performance of 18.5 L/h in the ATEQ airflow test.

Test Methods

Insertion Loss Detection Test

Figure 8:
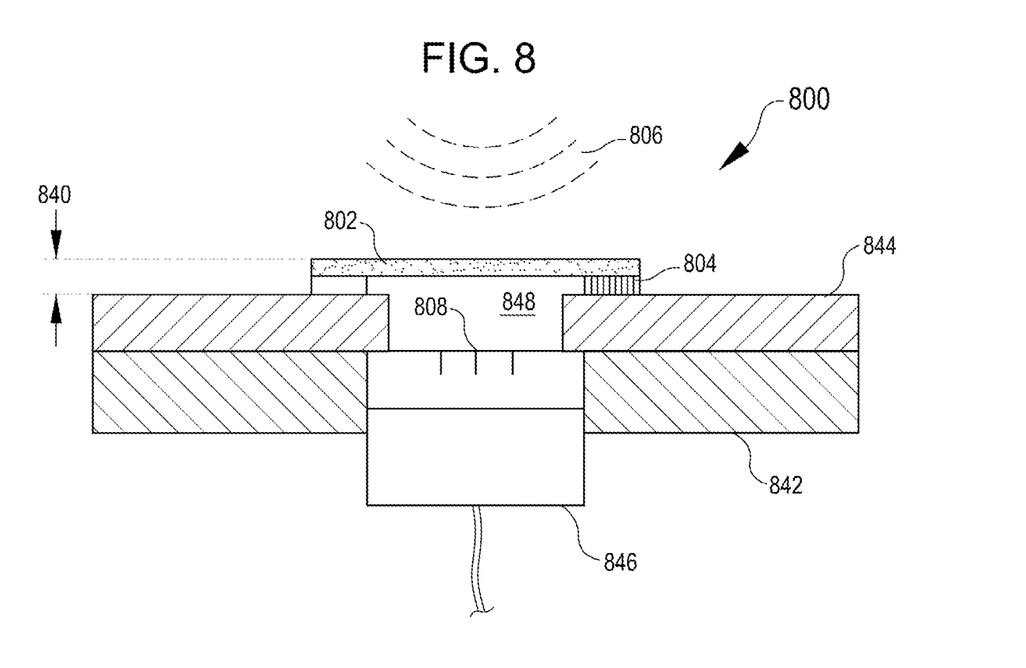
FIG. 8 is a side section view illustrating a test assembly for testing performance characteristics of an acoustic membrane.

FIG. 8 illustrates an example test assembly 800 for detecting insertion loss. Insertion loss can be detected by connecting each example membrane (comparative example membranes and retracted membrane materials) with an orifice 848 of a sample holder plate 842, fully encasing the assembly, and measuring sound generated by a speaker after passing through the orifice and the assembly.

Each sample 802 was formed into a circular acoustic cover having an inner diameter of 1.6 mm, e.g., by way of an adhesive ring 804, and placed over a circular aperture 848 of 1 mm diameter on a sample holder plate 842 by means of an adhesive layer 844. The sample was placed inside a B&K type 4232 anechoic test box at a distance of 6.5 cm from an internal driver or speaker. A Knowles® SPA2410LR5H MEMS measurement microphone 846 was assembled with the sample holder plate 842, e.g. by way of soldering.

The speaker was excited to produce an external stimulus 806 at 1 Pa of sound pressure (94 dB SPL) over the frequency range from 100 Hz to 11.8 kHz. The measurement microphone 846 measured the acoustic response as a sound pressure level in dB over the frequency range. Measurements were obtained with the aperture 848 uncovered, i.e. with no sample 802 present, for calibrating the loss detection test. Measurements were obtained by introducing each respective example as the sample 802.

Figure 9:
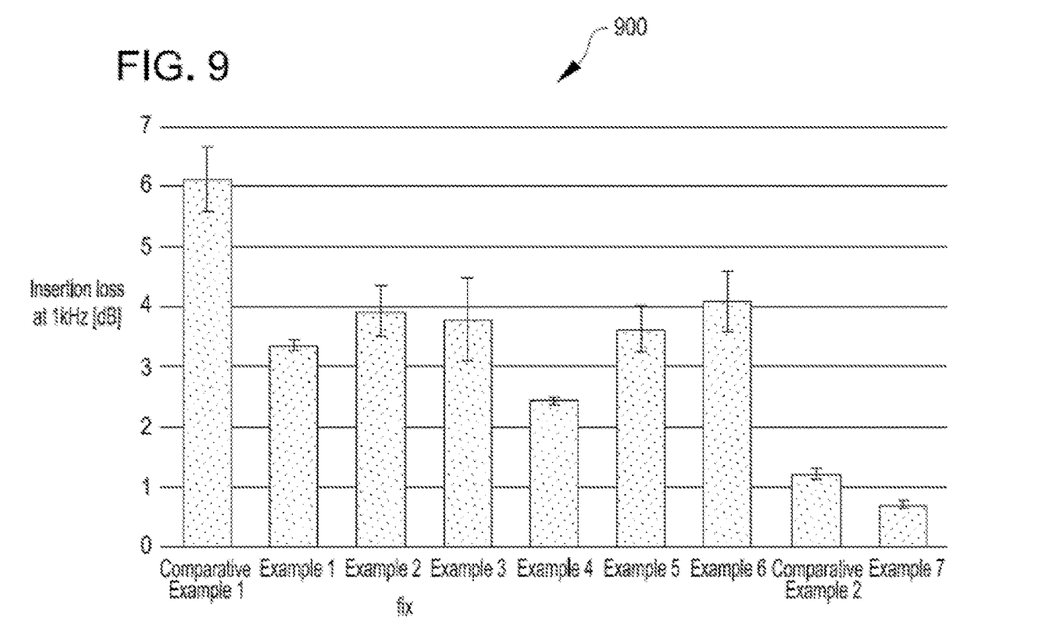
FIG. 9 is a chart graphically illustrating insertion loss (i.e. difference in sound pressure level compared to an unobstructed microphone) for various embodiments of an acoustic protective cover.

FIG. 9 shows a chart 900 graphically illustrating the insertion losses for Comparative Examples 1-2 and Examples 1-7 discussed above and tabulated in Table 1. The chart 900 shows insertion loss (i.e. difference in sound pressure level compared to an unobstructed microphone) at a frequency of 1 kHz for the various embodiments of a pressure equalizing assembly described above with respect to FIGS. 2-7, and in conjunction with a testing assembly similar to the test assembly 800 shown in FIG. 8. The chart 900 shows error bars reflecting one standard deviation in the measurement of insertion loss.

ATEQ Airflow Test

ATEQ Airflow is a test method for measuring laminar volumetric flow rates of air through membrane samples. For each example, a sample was produced in membrane form having an area of 2.0 cm$^2$. The samples were clamped between two plates in a manner that seals the sample across a flow pathway. An ATEQ Corp. Premier D Compact Flow Tester was used to measure airflow rate (L/hr) through each acoustic membrane sample by challenging it by a differential pressure of 1.2 kPa (12 mbar) of air pressure through the flow pathway.

Water Entry Pressure (WEP) Test

WEP was determined in similar manner to the ATEQ airflow test by subjecting the samples in a test assembly to water with differential pressures of 34.5 and 500 kPa across a flow pathway.

Bubble Point Test

Bubble point was determined via a Capillary Flow Porometer, CFP-1500, made by Porous Materials Inc.

Thickness

Samples were measured using a Keyence LS-7010M digital micrometer.

The invention has now been described in detail for the purposes of clarity and understanding. However, those skilled in the art will appreciate that certain changes and modifications may be practiced within the scope of the appended claims.

In the preceding description, for the purposes of explanation, numerous details have been set forth in order to provide an understanding of various embodiments of the present invention. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present invention. Accordingly, the above description should not be taken as limiting the scope of the present invention or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

In the following, further examples are described to facilitate understanding of the disclosure:

E1. A sound-transmissive cover for an acoustic device, the cover including: an expanded fluoropolymer membrane having a microstructure including serpentine fibrils, wherein the expanded fluoropolymer membrane has an acoustic insertion loss of less than 6 dB at 1 kHz, and a water entry pressure (WEP) of at least 9.8 kPa.

E2. The cover of example 1, wherein the expanded fluoropolymer membrane has an ATEQ airflow rate of at least 10 L/hr per 2.0 cm$^2$.

E3. The cover of any of the preceding examples, wherein the expanded fluoropolymer membrane has an acoustic insertion loss of less than 5 dB at 1 kHz.

E4. The cover of any of the preceding examples, wherein the expanded fluoropolymer membrane has an acoustic insertion loss of less than 4 dB at 1 kHz.

E5. The cover of any of the preceding examples, wherein the expanded fluoropolymer membrane has an acoustic insertion loss of less than 3 dB at 1 kHz.

E6. The cover of any of the preceding examples, wherein the expanded fluoropolymer membrane has an acoustic insertion loss of less than 1 dB at 1 kHz.

E7. The cover of any of the preceding examples, wherein the expanded fluoropolymer membrane has an area density greater than or equal to 6 g/m2 and a thickness less than 15 µm.

E8. The cover of any of the preceding examples, wherein the expanded fluoropolymer membrane has an area density greater than or equal to 7 g/m2 and a thickness less than 15 µm.

E9. The cover of any of the preceding examples, wherein the expanded fluoropolymer membrane has an ATEQ airflow rate of at least 15 L/hr per 2.0 cm$^2$.

E10. A waterproof sound-transmissive cover for an acoustic device, the cover including: a retracted membrane material having an acoustic insertion loss of less than 6 dB at 1 kHz and a WEP of at least 9.8 kPa.

E11. The cover of example 10, wherein the retracted membrane material has an ATEQ airflow rate of at least 10 L/hr per 2.0 cm$^2$.

E12. The cover of any of the preceding examples, wherein the retracted membrane material has an area ratio of less than 0.75:1 relative to an initial area of a precursor membrane.

E13. The cover of any of the preceding examples, wherein the retracted membrane material has a mass per area of at least 6.9 g/m2 and a thickness of less than 16 µm.

E14. The cover of any of the preceding examples, wherein the retracted membrane material is air permeable.

E15. The cover of any of the preceding examples, wherein the retracted membrane material includes a thermally retracted membrane.

E16. The cover of any of examples 1-14, wherein the retracted membrane material includes a solvent retracted material.

E17. The cover of any of the preceding examples, wherein the retracted membrane material has an area ratio of less than 75% of an associated precursor membrane.

E18. The cover of any of the preceding examples, wherein the retracted membrane material includes an expanded fluoropolymer membrane.

E19. The cover of any of the preceding examples, wherein the retracted membrane material has a microstructure including serpentine fibrils.

E20. A protective cover assembly for an acoustic device, the assembly including: a housing having an opening for passing acoustic waves between an exterior of the housing and an acoustic cavity therein; and a sound-transmissive membrane connected with the housing and separating the acoustic cavity and the exterior of the housing, wherein the retracted membrane, e.g., sound-transmissive membrane, has an acoustic insertion loss of less than 6 dB at 1 kHz, and a water entry pressure (WEP) of at least 9.8 kPa.

E21. The assembly of example 20, wherein the sound-transmissive membrane has an ATEQ airflow rate of at least 10 L/hr per 2.0 cm$^2$.

E22. The assembly of any of the preceding examples, wherein the sound-transmissive membrane has an acoustic insertion loss of less than 5 dB at 1 kHz.

E23. The assembly of any of the preceding examples, wherein the sound-transmissive membrane includes an expanded fluoropolymer membrane.

E24. The assembly of any of the preceding examples, wherein the sound-transmissive membrane includes an ePTFE membrane.

E25. The assembly of any of the preceding examples, wherein the sound-transmissive membrane includes a retracted membrane material having an area ratio of less than 75% of an associated precursor membrane.

E26. The assembly of any of the preceding examples, wherein the sound-transmissive membrane material is thermally retracted.

E27. The assembly of any of examples 20-25, wherein the sound-transmissive membrane material is solvent-retracted.

E28. The assembly of any of the preceding examples, wherein the sound-transmissive membrane has a microstructure comprising serpentine fibrils.

E29. The assembly of any of the preceding examples, further including: an acoustic device connected with the acoustic cavity, the acoustic device capable of generating and/or receiving the acoustic waves.

What is claimed is:

1. A sound-transmissive cover for an acoustic device, the sound-transmissive cover configured to connect to the acoustic device, the sound-transmissive cover comprising:
a retracted membrane material,
wherein the retracted membrane material has an acoustic insertion loss of less than 6 dB at 1 kHz and a water entry pressure (WEP) of at least 9.8 kPa,
wherein the retracted membrane material has a microstructure,
wherein the microstructure includes serpentine fibrils,
wherein the serpentine fibrils are obtainable by a retraction process which reduces an area ratio,
wherein the retraction process is a separate process from an expansion process,
wherein the serpentine fibrils comprise S-shaped regions that are curved in more than one direction, and
wherein the serpentine fibrils have a width of 1 micron or less.

2. The sound-transmissive cover of claim 1, wherein the retracted membrane material has an ATEQ airflow rate of at least 10 L/hr per 2.0 cm$^2$.

3. The sound-transmissive cover of claim 1, wherein the retracted membrane material has an acoustic insertion loss of less than 5 dB at 1 kHz.

4. The sound-transmissive cover of claim 1, wherein the retracted membrane material has an area density greater than or equal to 6 g/m$^2$, and a thickness less than 15 μm.

5. The sound-transmissive cover of claim 1, wherein the cover is waterproof.

6. The sound-transmissive cover of claim 1, wherein the retracted membrane material has an area ratio of less than 0.75:1 relative to an initial area of a precursor membrane.

7. The sound-transmissive cover of claim 1, wherein the retracted membrane material has a mass per area of at least 6.9 g/m$^2$ and a thickness of less than 16 μm.

8. The sound-transmissive cover of claim 1, wherein the retracted membrane material is air permeable.

9. The sound-transmissive cover of claim 1, wherein the retracted membrane material comprises a thermally retracted membrane.

10. The sound-transmissive cover of claim 1, wherein the retracted membrane material comprises a solvent retracted material.

11. The sound-transmissive cover of claim 1, wherein the retracted membrane material comprises an expanded fluoropolymer membrane.

12. The sound-transmissive cover of claim 1, wherein the retracted membrane material has an ATEQ airflow rate of at least 15 L/hr per 2.0 cm$^2$.

13. The sound-transmissive cover of claim 1, wherein the retracted membrane material has an acoustic insertion loss of less than 4 dB at 1 kHz.

14. The sound-transmissive cover of claim 1, wherein the retracted membrane material has an acoustic insertion loss of less than 3 dB at 1 kHz.

15. The sound-transmissive cover of claim 1, wherein the retracted membrane material has an acoustic insertion loss of less than 1 dB at 1 kHz.

16. The sound-transmissive cover of claim 1, wherein the retracted membrane material has an area density greater than or equal to 7 g/m$^2$.

17. The sound-transmissive cover of claim 1, wherein the retracted membrane material has an area density less than 15 g/m$^2$.

18. A protective cover assembly for an acoustic device, the protective cover assembly configured to connect to the acoustic device, the protective cover assembly comprising:
a housing,
wherein the housing has an opening configured to pass acoustic waves between an exterior of the housing and an acoustic cavity therein; and
a retracted membrane,
wherein the retracted membrane has an acoustic insertion loss of less than 6 dB at 1 kHz and a water entry pressure (WEP) of at least 9.8 kPa,
wherein the retracted membrane material has a microstructure,
wherein the microstructure includes serpentine fibrils,
wherein the serpentine fibrils are obtainable by a retraction process which reduces an area ratio,
wherein the retraction process is a separate process from an expansion process,
wherein the serpentine fibrils comprise S-shaped regions that are curved in more than one direction, and
wherein the serpentine fibrils have a width of 1 micron or less.

19. The protective cover assembly of claim 18, further comprising:
an acoustic device connected to the acoustic cavity,
wherein the acoustic device is configured to generate the acoustic waves, receive the acoustic waves, or generate and receive the acoustic waves.

20. A sound-transmissive cover for an acoustic device, the sound-transmissive cover configured to connect to the acoustic device, the sound-transmissive cover comprising:
an expanded fluoropolymer membrane,
wherein the expanded fluoropolymer membrane comprises a retracted membrane material,
wherein the retracted membrane material has a microstructure,
wherein the microstructure includes serpentine fibrils,
wherein the serpentine fibrils are obtainable by a retraction process which reduces an area ratio,
wherein the retraction process is a separate process from an expansion process,
wherein the serpentine fibrils comprise S-shaped regions that are curved in more than one direction; and
wherein the retracted membrane material has an acoustic insertion loss of less than 6 dB at 1 kHz, and a water entry pressure (WEP) of at least 9.8 kPa, and
wherein the retracted membrane material has an area ratio of less than 0.75:1 relative to an initial area of a precursor membrane.

* * * * *